United States Patent

Coral et al.

[11] Patent Number: 6,118,040
[45] Date of Patent: Sep. 12, 2000

[54] METHOD AND APPARATUS FOR PURIFYING A GASEOUS MIXTURE INCLUDING MOLECULES AND/OR CELLS OF TOXIC OR POLLUTING SUBSTANCES

[75] Inventors: Nevio Coral; Luciano Coral; Claudio Coral, all of Leini', Italy

[73] Assignee: Coral S.p.A., Leini, Italy

[21] Appl. No.: 08/981,335

[22] PCT Filed: Jun. 27, 1996

[86] PCT No.: PCT/IT96/00130

§ 371 Date: Apr. 7, 1998

§ 102(e) Date: Apr. 7, 1998

[87] PCT Pub. No.: WO97/01386

PCT Pub. Date: Jan. 16, 1997

[30] Foreign Application Priority Data

Jun. 27, 1995 [IT] Italy .................................. T095A0539

[51] Int. Cl.[7] ................................................... B01J 19/12
[52] U.S. Cl. ..................... 588/204; 204/164; 204/168; 204/169; 204/170; 204/178; 204/179; 422/186.04
[58] Field of Search ............................. 588/204; 204/164, 204/168, 169, 170, 178, 179; 422/186.04

[56] References Cited

U.S. PATENT DOCUMENTS 3,875,034   4/1975   Adams et al. .
5,236,672   8/1993   Nunez et al. ................. 422/186.04

FOREIGN PATENT DOCUMENTS 0 250 866    1/1990   European Pat. Off. .
0 579 105    1/1994   European Pat. Off. .
WOA9102581   3/1991   WIPO .

*Primary Examiner*—Arun S. Phasge
*Attorney, Agent, or Firm*—Darby & Darby

[57] ABSTRACT

The method includes a step of creating a flow of the mixture, a step of generating an electron discharge at a velocity such as to create a zone in which the mixture is ionised and a step of directing a series of electron beams so as to intercept the flow of the mixture whereby the peripheral electron bonds of the polluting molecules and/or cells are broken by collision with the ions formed in the mixture. The apparatus includes an ionisation cell (10) having an anode (12) and an emitting cathode (13) excited at a negative voltage of the order of 50,000 volts. The cathode (13) has a series of pointed elements for emitting electron beams (30) which intersect in a zone (11) of interception of the mixture.

18 Claims, 3 Drawing Sheets

METHOD AND APPARATUS FOR PURIFYING A GASEOUS MIXTURE INCLUDING MOLECULES AND/OR CELLS OF TOXIC OR POLLUTING SUBSTANCES

This application is a 371 of PCT/It96/00130 filed Jun. 27, 1996.

TECHNICAL FIELD

The present invention relates to a method and apparatus for purifying a gaseous mixture including molecules and/or cells of toxic or polluting substances.

BACKGROUND ART

Various types of apparatus for purifying gases to break down or neutralise the polluting substances are known. In one known type, also used in catalytic converters for the exhaust gases from internal combustion engines a thermal reactor is used in which the mass of the reactor is brought to a high temperature to achieve complete oxidation and/or thermal dissociation of the molecules of the polluting substances. For this operation it is first necessary to reduce the velocity of the gas flow drastically by passing it through a series of chambers or into a highly obstructive catalytic path.

This apparatus is in general very expensive both because of the energy required in operation and because of the equipment required for regulating and controlling it. Moreover it cannot be used when the gases to be purified contain molecules of heavy metals, chlorinated hydrocarbons, phosphorus, arsenic, boron, lead, zinc and like toxic substances.

Finally even for the substances for which this apparatus is effective, large quantities of carbon dioxide are released which is known to stratify at relatively low contents. A barrier or greenhouse is thus formed which means that heat accumulates causing harmful variations in local climate, for example in large cities.

Apparatus is also known for purifying gas by means of chemical reactions in which the pollutant is transferred to liquid or solid reagents. When these reagents become saturated or exhausted, however, they become corrosive and/or caustic whereby it is not easy to dispose of them ecologically.

Finally, purifying apparatus is known which is based on the reaction of molecules in a gas with molecules on the surface of a solid material, known as adsorption. In this, the gas is retained by the surfaces of grains of adsorbent material, for example activated carbon, in a so-called adsorption reactor. These reactors, however, have the disadvantage that the surfaces of the grains rapidly become clogged so that they have to be regenerated frequently. Hence, in general, this type of apparatus may be used solely with gases having low concentrations of substances to be removed. Moreover, in a plant which operates in a continuous cycle, the apparatus must be duplicated so that there is always one unit working while the other is being regenerated.

DISCLOSURE OF INVENTION

The object of the invention is to provide a method and apparatus for purifying gaseous mixtures which is extremely simple and reliable in operation and eliminates the problems of the prior art listed above.

This object is achieved by the purification method of the invention which includes a step of passing a flow of the gaseous mixture along a path and is characterised in that an electron discharge is generated in the path, the electrons travelling at velocities such as to create a zone of ionisation of the mixture, and a series of electron beams is directed so as to intercept the flow whereby the peripheral electron bonds of the molecules and/or cells of the said substances are broken by collision with the electrons.

The corresponding apparatus is arranged in a path along which the mixture is conveyed and is characterised in that it includes an ionisation cell for creating a discharge of electrons at velocities such as to create an ionisation zone which intercepts the mixture, breaking the peripheral electron bonds of the molecules and/or cells of the said substances.

BRIEF DESCRIPTION OF DRAWINGS

For a better understanding of the invention, a preferred embodiment will be described below purely by way of example, with the aid of the appended drawings, in which.

BEST MODE FOR CARRYING OUT THE INVENTION

Atmospheric pollution in general, and of closed environments in particular, results from the mixture of air with gaseous components, which are often noisome, and suspensions of dust of various types, for example pollens, which cause allergies, or bacteria or the like. All these substances may also be toxic or noxious when breathed in by living beings More particularly, in industrial plants, for example chemical plants, the usual chimneys convey a gaseous mixture into the atmosphere which is generally termed simply 'gas' but which carries high concentrations of molecules of one or more of the following substances mixed or suspended therein: heavy metals, lead, zinc, boron, cement, arsenic, phosphorus, chlorinated hydrocarbons derived from plastics materials, and other substances.

In addition combustion plants in general and internal combustion engines in particular discharge gases into the atmosphere which contain one or more of the following substances: powdered carbon and sulphur, unburnt hydrocarbons, carbon monoxide, oxides of nitrogen, carbon dioxide and oxides of sulphur, sulphides, benzene, etc.

Moreover in closed animal breeding and plant cultivation environments, the air is polluted by molecules of noisome substances and/or pollens. Finally enclosed environments for public use, for example convention and entertainment halls, as well as in hospitals and nursing homes, the air is vitiated or polluted by carbon dioxide and various exhalations and bacteria or the like.

Figure 1:
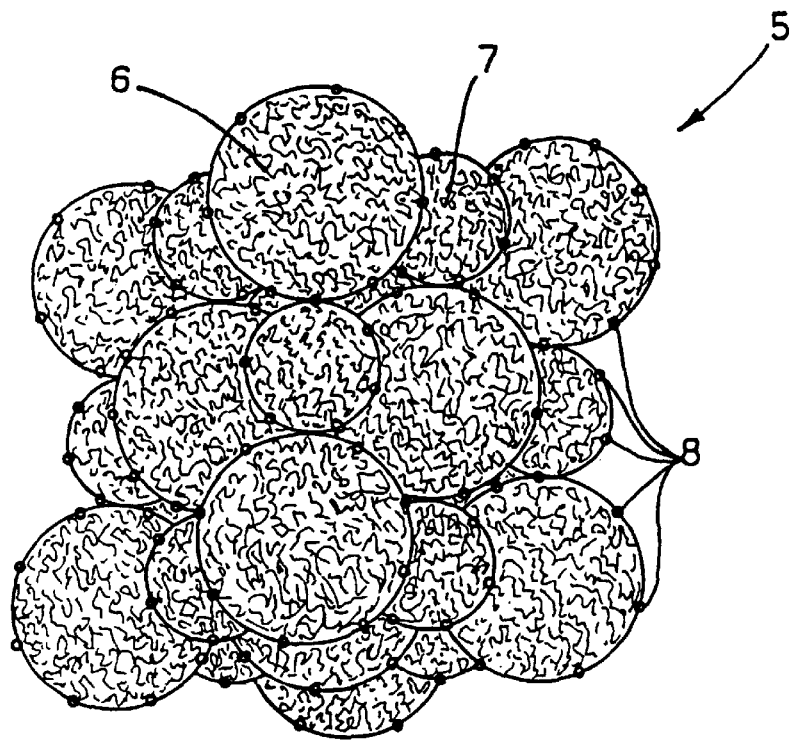
FIG. 1 is a schematic drawing of a complex molecule of a polluting substance.

The molecules of such organic and inorganic pollutants are generally complex, that is, formed from several simple molecules. By way of example, FIG. 1 shows a complex pollutant molecule 5 which is constituted by a number of simple molecules 6 and 7 held together by bonds formed by negative electrons 8 moving in orbits outside the nucleus of the individual molecules. These electrons, due to their high velocities, acquire centrifugal forces away from the nuclei which are, in general, balanced by the centripetal attractive forces of the positive ions of the nuclei, whereby the molecules are neutral.

Biological pollutants are, in their turn, generally constituted by cells or groups of cells which, in certain conditions, tend to reproduce and to influence the cells of other organisms.

It is known from physics that, if a suitable negative electric voltage is applied to a cathode immersed in a gas, the negative electrons concentrate on its surface. When a predetermined voltage is exceeded, these electrons are expelled and travel at high velocities towards the anode. These electrons, in impinging upon particles of gas or dust (molecules or cells), create other ions whereby the whole gaseous mixture rapidly becomes ionised. If the surface of the cathode has an edge, a projection or a pointed element, the electrons accumulate and are emitted continuously from the edge, projection or pointed element.

Figure 2:
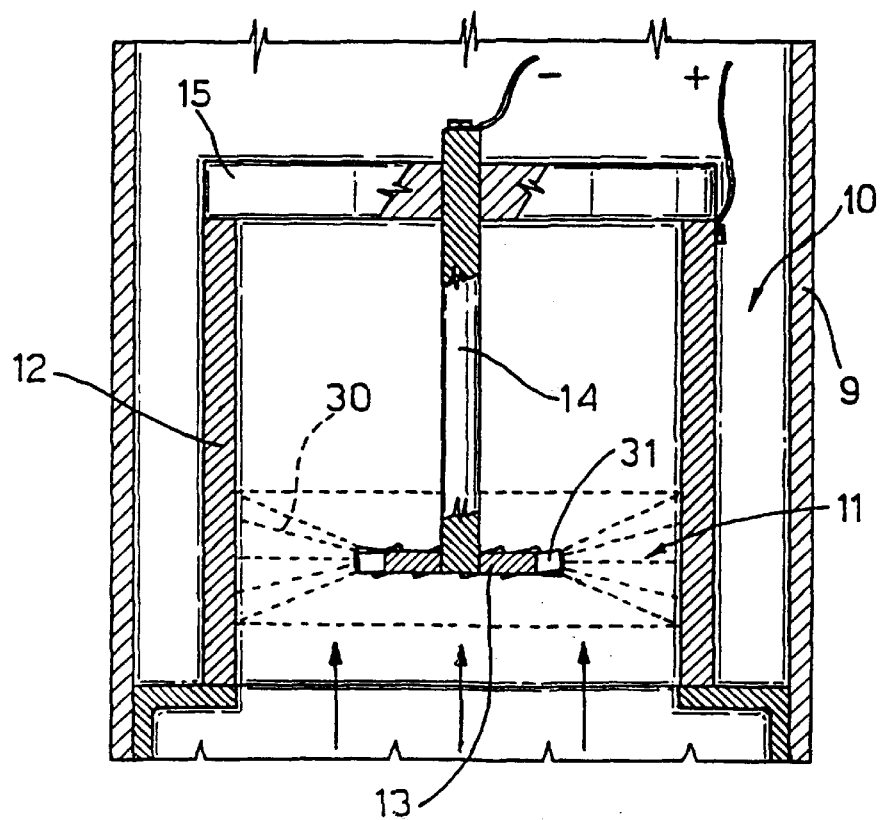
FIG. 2 is a schematic section of a gas duct of apparatus for carrying out the purifying method of the invention.

With reference to FIG. 2, an exhaust duct is generally indicated 9 which is arranged to convey the gas towards the exterior. Purification apparatus is arranged in the duct 9 and includes a cell generally indicated 10 in which an electron discharge is generated, the electrons travelling at velocities such as to create a zone 11 of ionisation of the gas. More particularly, the cell 10 includes a cylindrical anode 12 of conductive material, for example aluminium, or preferably stainless steel to avoid the problems of oxidation.

Within the anode 12 is a cathode 13 for emitting negative ions which is constituted by a circular disc of conductive material fixed to a shank 14 which is connected to a bar 15 of non-conductive material. The bar 15 is in turn fixed to the upper edge of the anode 12. The disc 13 carries a series of metal filiform elements 31, for example like those of a metal brush. Alternatively the disc 13 may have a series of triangular teeth.

Figure 3:
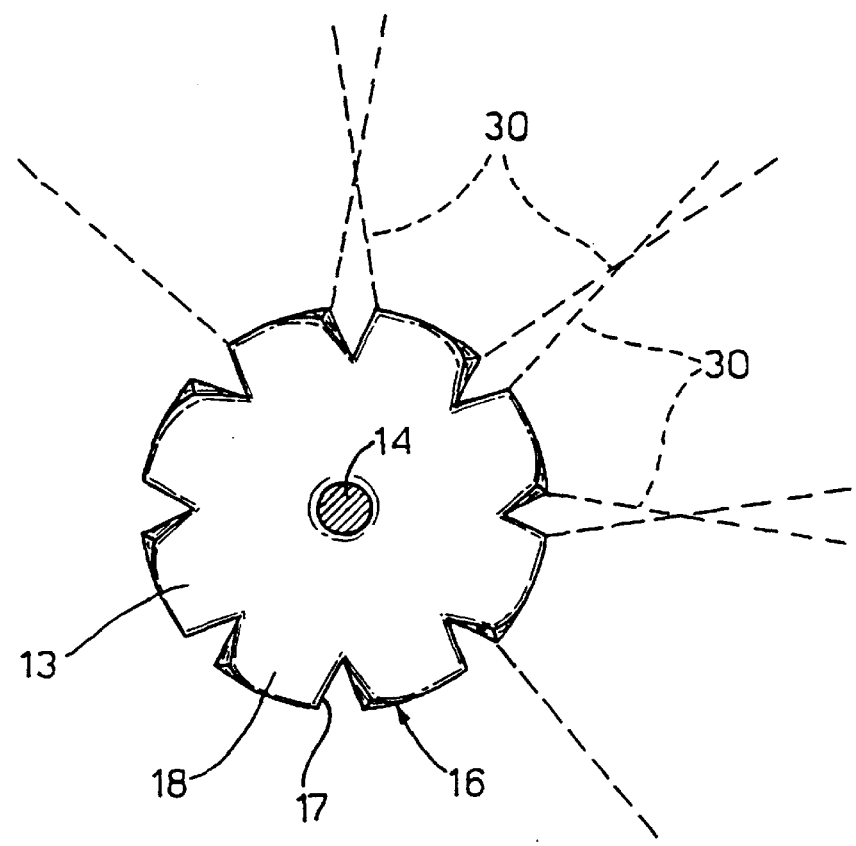
FIG. 3 is a plan view of a detail of the apparatus according to a variant of FIG. 2, on an enlarged scale.
Figure 4:
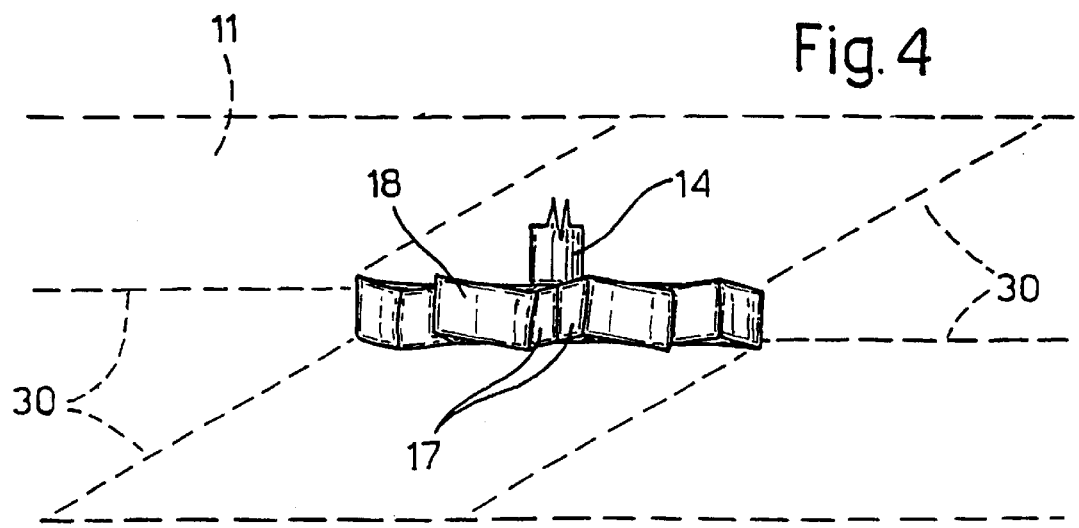
FIG. 4 is a side view of the detail of FIG. 3.
Figure 5:
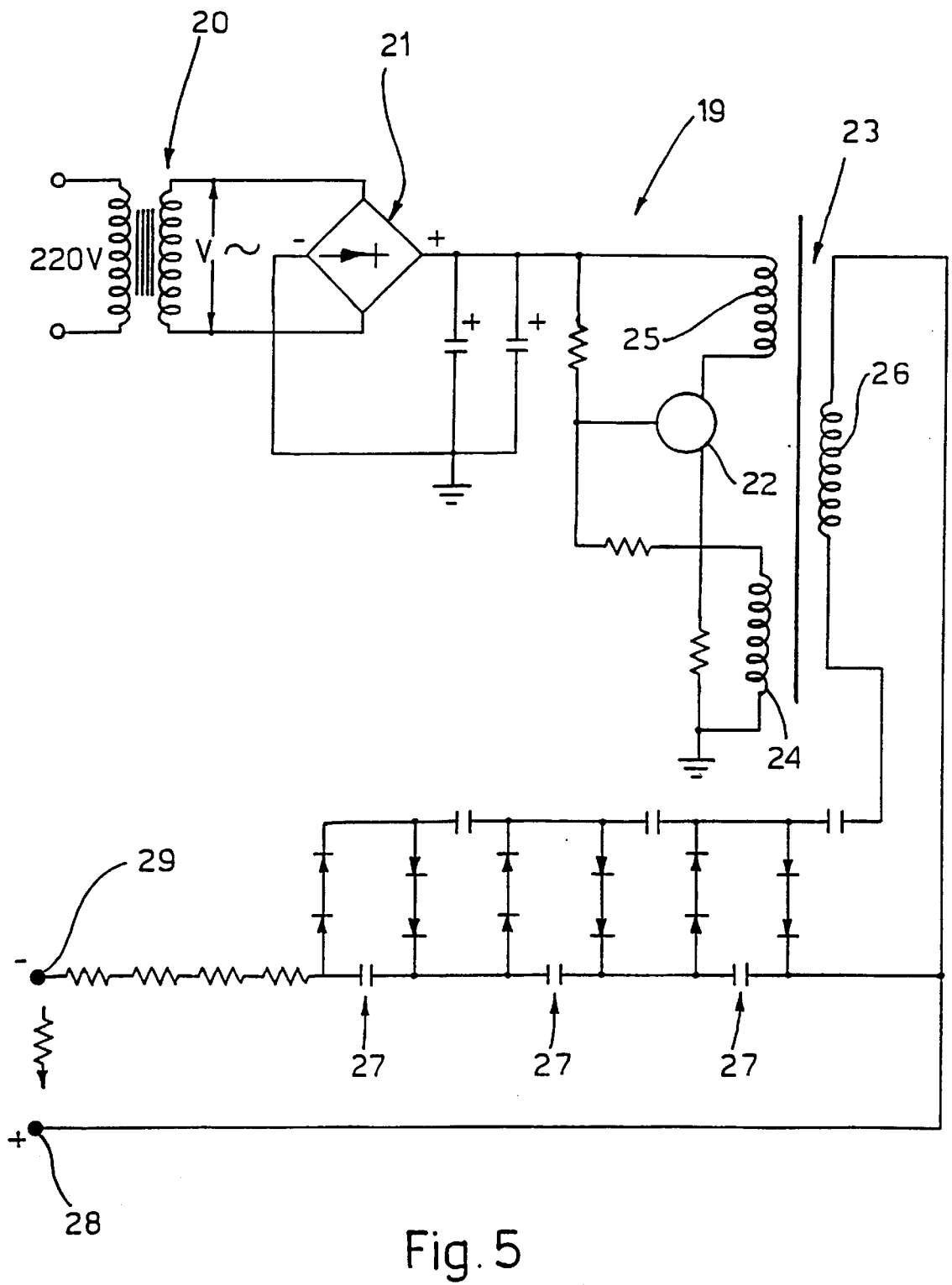
FIG. 5 is an electronic circuit diagram for the supply of the apparatus of FIG. 2.

In the variant shown in FIGS. 3 and 4, the disc 13 is of sheet metal of a predetermined thickness and has a peripheral edge 16 formed with a set of V-shaped notches 17 at predetermined mutual spacings. The notches 17 are separated by teeth 18 each of which is bent into a helical shape about a radial axis relative to the disc 13 whereby the outer edge 16 of each tooth is disposed in a helix.

The voltage supplied to the purification cell 10 is generated by an electronic circuit, generally indicated 19, which includes a transformer 20 for reducing the mains voltage and a current rectifier 21 which rectifies the mains alternating current. The direct current output by the rectifier 19 supplies an oscillator 22, thus producing a pulse rectified voltage which pilots a special auto-transformer 23 for raising the voltage. The primary of the transformer 23 has two opposed windings 24 and 25 while the secondary has a single winding 26.

The voltage obtained across the secondary coil of the transformer 23 is finally raised appropriately by a chain of elements 27, known per se, each of which doubles the input voltage. The required high voltage may thus be obtained at two output terminals 28 and 29 of this circuit 19. Obviously when the cell 10 is applied to an exhaust duct of an internal combustion engine of a motor vehicle, both the transformer 20 and the rectifier 21 are omitted from the circuit 19.

The two terminals 28 and 29 are connected to the anode 12 (FIG. 2) and the cathode 13 respectively of the cell 10. This may be excited at a voltage of between 30,000 and 70,000 volts, preferably of the order of 50,000 volts. This voltage generates an electron discharge in which the electrons reach high velocities but less than that of light whereby they are not converted into photons. With a voltage in the range indicated above, the electrons emitted travel in a straight line at a speed of between one fifth and one half the speed of light. With the voltage of 50,000 volts, this velocity is of the order of 100,000 km/sec.

When the cell 10 is excited at this voltage, the negative electrons are emitted through the tips of the elements 31 or the outer edges 16 of the teeth 18, generating electron beams 30 which are substantially radial and divergent. In the variant of FIG. 2, the beams 30 are emitted by the elements 31 so as to create the ionisation zone 11. In the variant of FIGS. 3 and 4, the beam 30 emitted by the edge 16 of a tooth 18 intersects the beams 30 emitted by the edges 16 of the adjacent teeth 18 whereby a zone of ionisation 11 is created.

The zone 11 constitutes an electron barrier which acts as a molecular filter through which the gases to be purified are forced to pass. Moreover, the helical shape of the edges 16 of the teeth 18 means that beams 30 are generated which are directed in two directions slightly inclined in opposite directions to the plane of the disc 13 (FIG. 4) whereby the ionisation zone 11 assumes a corresponding thickness along the path of the gases.

The direct collision of the high-velocity electrons with the complex molecules 5 is such as to break the peripheral electron bonds of the molecules, splitting the molecules into simpler molecules or elementary particles which are no longer polluting and which have picked up a negative electrostatic charge. The collisions with the electrons also transform any simple molecules of chemical elements into non-polluting allotropes or groups of allotropic atoms, that is, into elements which differ in their physical and chemical properties.

The high-velocity electrons also attack the biological cells, for example pollens, bacteria and the like, which generally have a positive electrostatic charge and are neutralised, transforming these into neutral molecules. Hence the cell 10 is also suitable for sterilising and revitalising the air of closed public, industrial or hospital environments.

It is known that negative ions also have a stimulating action on the respiratory tract and the blood circulation. They in fact reduce the hormone serotonin present in the blood of mammals which is the main cause of physical depression. Moreover this hormone stimulates the production of red corpuscles and reduces the cholesterol level in the blood. The interception of the molecules of environmental air with the barrier of electrons thus generates a current of purified air formed by negative ions and free oxygen ions at the outlet from the duct 9. The current, thus purified, may then be likened to mountain air in which the concentration of negative ions may reach values of $10^9$ per cubic meter.

The air, thus revitalised, and consequently enriched with oxygen, may be used for the air supply to industrial burners or internal combustion engines, thus increasing the combustion or engine efficiency. Moreover this revitalised air may be used in any other process in which oxygen is required.

It is thus clear that the apparatus described can be used to carry out a purification method including a step in which a gaseous mixture is made to flow along a path, a step in which an electron discharge is generated, the electrons travelling at a velocity such as to create an ionisation zone in the gaseous mixture in transit, and a step in which a series of electron beams 30 is directed so as to intercept the flow of the mixture whereby the peripheral electron bonds of the molecules and/or cells of the polluting substances are broken by collision with the electrons in the free discharge step.

From the above, the advantages of the method and apparatus of the invention over the prior art will be is clear. Indeed the method allows gaseous mixtures with a wide range of pollutants to be purified. Since the purification process is purely physical, stoppages due to accumulation of waste which would require periodic intervention or other disposal treatment are not caused. Moreover the apparatus may be designed for a wide range of applications, whether industrial, for means of transport and for closed locations such as hospitals and public buildings.

It is understood that the method and the apparatus described may be modified and improved in various ways without departing from the scope of the claims. For example the anode of the cell may be of prismatic shape. Moreover the notched disc may be replaced by a series of separate elements of different geometric shapes arranged so as to emit beams of electrons which cross in the zone of interception.

For example, the anode 12 may be a ring shape and/or may be offset with respect to the cathode 13 so that the electron beam forms a sort of umbrella from the cathode 13 to the anode 12. Moreover the cathode 13 may be formed from two or more discs 13 parallel to each other, possibly with different diameters and with different numbers of teeth or other point-like elements so as to increase the thickness and effectiveness of the ionisation zone 11 for the interception of the molecules.

The cathode may also be formed by a brush of metal wires connected to a cylindrical or helical support or support of other shape. Finally, the anode may be formed from a plate of rectangular or other shape and the cathode may be formed from a brush having a shape corresponding to that of the anode with the metal elements directed substantially towards the anode.

We claim:

1. A method for purifying a gaseous mixture including at least one of molecules and cells of toxic or polluting substances, comprising the steps of:
    passing a flow of gaseous mixture along a path, and
    generating an electron discharge in the path to create a zone of ionization within the gaseous mixture,
    wherein electrons within the electron discharge form a series of electron beams which intercept the flow of gaseous mixture, the electron discharge is obtained via a voltage of between 30,000 and 70,000 volts which causes electrons within the series of electron beams to travel at velocities of between one fifth and one half light speed and breaks peripheral electron bonds of at least one of collided molecules and cells of the substances such that non-polluting allotropic elements are produced.

2. The method according to claim 1, wherein the voltage is a pulsed rectified voltage.

3. The method according to claim 1, wherein the gaseous mixture is an industrial waste product, and the substances are molecules selected from the group consisting of heavy metals, lead, zinc, boron, chlorinated hydrocarbons, arsenic and phosphorus.

4. The method according to claim 1, wherein the gaseous mixture comprises one of combustion plant exhaust gases and internal combustion engine exhaust gases, and the substances are molecules selected from the group consisting of hydrocarbons, carbon, sulphur, carbon monoxides, nitric oxide, carbon dioxide or oxides, sulphur and benzene.

5. The method according to claim 1, wherein the gaseous mixture originates from one of a closed animal breeding environment and plant cultivation environment, and the substances include at least one of noisome substances and pollens.

6. The method according to claim 1, wherein the gaseous mixture is vitiated air from one of a closed public, an industrial and a hospital environment, the substances include one of dust, carbon dioxide, bacteria, and ions within the gaseous mixture have a negative polarity such that the vitiated air is revitalized and sterilized upon contact with the gaseous mixture.

7. The method according to claim 1, wherein the zone of ionization generates negative ions and free ionic oxygen to enrich oxygen in air supplied to burners of one of industrial plants and internal combustion engines.

8. An apparatus for purification of a gaseous mixture including at least one of molecules and cells of toxic or polluting substances, comprising:
    conveying means for conveying the gaseous mixture along a predetermined path,
    an ionization cell housed in said path within said conveying means, said cell including a substantially cylindrical anode and a central emitting cathode comprising at least one disc, said anode and cathode being energized by an electric power source for causing a discharge of electrons to create an ionization zone,
    wherein the discharge of electrons forms a series of electron beams which intercept the gaseous mixture, at least one disc has a series of punctiform elements for ejecting the series of electron beams in shapes which correspond to shapes and positions of the anode and the cathode such that an interception barrier which acts as a filter for the gaseous mixture is formed, and the electric power source generates the discharge of electrons via a voltage of between 30,000 and 70,000 volts such that electrons within the series of electron beams travel at velocities of between one fifth and one half light speed and break peripheral electron bonds of at least one of collided molecules and cells of the substances such that non-polluting allotropic elements are produced.

9. The Apparatus according to claim 8, wherein the at least one disc comprises metal filiform elements disposed in a brush arrangement.

10. The apparatus according to claim 9, wherein the punctiform elements comprise a series of teeth having edges, the series of electron beams emitted by the edges of the series of teeth diverge to partially intersect the series of electron beams emitted by the edges of adjacent teeth within the series of teeth.

11. The apparatus according to claim 10, wherein the teeth have a helical shape for inclining the series of electron beams (30) emerging from the edges of the series of teeth in directions which are opposite to the at least one disc such that an ionization zone of substantial thickness is formed along the predetermination path.

12. The apparatus according to claim 8, wherein the electric power source includes an electronic circuit having a rectifier and an oscillator which outputs the pulsed rectified voltage to the cathode.

13. The apparatus according to claim 12, wherein the electric power source includes a transformer for raising the voltage output by the oscillator.

14. The apparatus according to claim 13, wherein the electric power source further includes at least one element for doubling the voltage to raise the voltage output by the transformer.

15. A method for purifying a gaseous mixture including at least one of molecules and cells of toxic or polluting substances, comprising the steps of:

passing a flow of gaseous mixture along a path, and generating an electron discharge in the path to create an ionization zone within the mixture, wherein the electron discharge forms a series of electron beams which intercept the flow of gaseous mixture, and the electron discharge is generated by a voltage which causes electrons within the electron discharge to be emitted at velocities of between one fifth and one half light speed such that the electrons within the electron discharge are prevented from being converted into photons and peripheral electron bonds of at least one of collided molecules and cells of the substances are broken such that non-polluting allotropic elements are produced.

16. The method according to claim 15, wherein said generating the electron discharge is performed using a voltage between 30,000 and 70,000 volts, and electrons within the electron discharge are emitted at a velocity of between one fifth and one half light speed.

17. An apparatus for purification of a gaseous mixture including at least one of molecules and cells of toxic or polluting substances, comprising:

conveying means for conveying the gaseous mixture along a predetermined path, an isolation cell housed in said conveying means, said cell including a substantially cylindrical anode and a central emitting cathode comprising at least one disc, said anode and said cathode being energized by an electric power source for causing a discharge of electrons to create an ionization zone, wherein the discharge of electrons forms a series of electron beams which intercept the gaseous mixture, the at least one disc has a series of punctiform elements and ejects the series of electron beams in shapes which correspond to shapes and positions of the anode and the cathode such that an interception barrier which acts as a filter for the gaseous mixture is formed, and the electric power source includes a rectifier and an oscillator which outputs a pulse rectified voltage which causes electrons within the electron discharge to be emitted at velocities of between one fifth and one half light speed such that the electrons within the electron discharge are prevented from being converted into photons and peripheral electron bonds of at least one of collided molecules and cells of the substances are broken such that non-polluting allotropic elements are produced.

18. The apparatus according to claim 17, wherein the electric power source includes a transformer and voltage raising means for raising the pulse rectified voltage to a voltage between 30,000 and 70,000 volts.

* * * * *